Patented Jan. 12, 1932

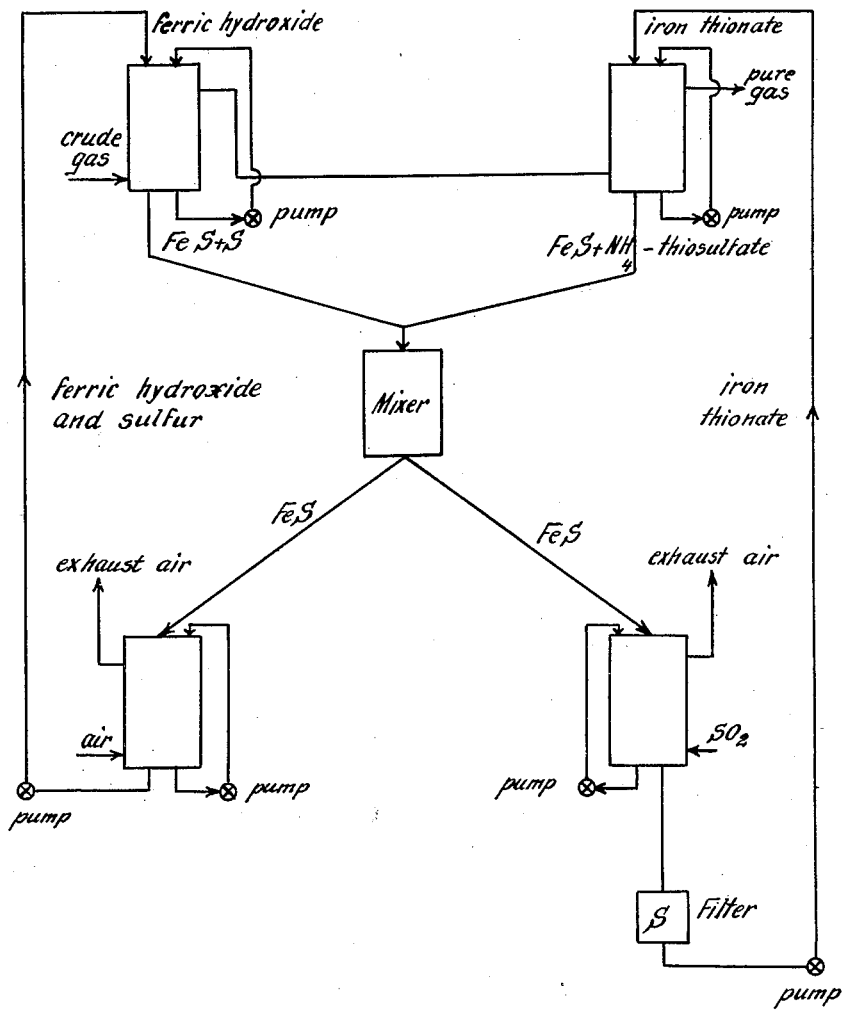

1,840,579

UNITED STATES PATENT OFFICE

CHRISTIAN J. HANSEN, OF ESSEN-RUHR, GERMANY, ASSIGNOR, BY MESNE ASSIGNMENTS, TO THE KOPPERS COMPANY, OF PITTSBURGH, PENNSYLVANIA, A CORPORATION OF DELAWARE

TREATING GASES

Application filed August 20, 1928, Serial No. 300,945, and in Germany October 22, 1927.

My invention refers to the treatment of gases, more especially gases such as result in the distillation of coal and other carbonaceous material. It is a particular object of my invention to provide means whereby the ammonia and sulfur which are contained in such gases, the latter mostly under the form of hydrogen sulfide, can be recovered from the gases in an easier and more perfect manner than was hitherto possible.

It is known to recover the ammonia and hydrogen sulfide from gases by means of solutions of metal thionates. In this process there results metal sulfide and a solution of ammonium thionate and in some cases also free sulfur.

The metal sulfide, which may be ferric sulfide, manganese sulfide or zinc sulfide is redissolved by acting thereon with sulfur dioxide and there results a metal thionate solution and free sulfur. This solution has hitherto been treated further in such manner that the solution containing, besides sulfur, metal and ammonium thionates in solution was decomposed by heating into sulfate and sulfur, and the metal (iron, manganese or zinc) was removed by treating the sulfate solution with fresh gas before starting the gas purification process proper.

The process above described involves the great disadvantage that in the case where iron is present, iron disulfide ($FeS_2$) is obtained, which is not soluble in sulfur dioxide and other acids.

The metal thionate solutions described are further able only to take up ammonia and hydrogen sulfide in the predetermined proportion of $2NH_3 : 1H_2S$. Now in view of the fact that the gases resulting for instance in the distillation of coal always contain more hydrogen sulfide (gas resulting in the distillation of Ruhr coal about 50 per cent, English coal partly 100 to 200 per cent more than corresponds to the above proportion), a process of purification as above described always leaves a more or less considerable proportion of hydrogen sulfide in the gas.

It is further known to remove hydrogen sulfide from gases free from ammonia by different means such as 1. Solutions of polythionates.
2. Solutions of thiosulfates, to which sulfur dioxide is added.
3. Suspensions of ferric hydroxide.

The means recited above for recovering the hydrogen sulfide differ as regards their velocity of reaction.

The slowest acting is the solution of polythionates while a thiosulfate solution, to which sulfur dioxide is added, will act somewhat more quickly. However the velocity of reaction of these solutions is always so small that in the case of a polythionate solution and a gas containing for instance 0.8 per cent $H_2S$, only 33 per cent of the hydrogen sulfide can be removed, with a solution of thiosulfate and sulfur dioxide only about 50% per unit of time.

On the other hand a suspension of ferric hydroxide will act on a gas washing liquor having neutral or slightly alkaline reaction so favorably that the total removal of hydrogen sulfide can be effected under commercial conditions.

Unfortunately the use of suspensions of ferric hydroxide involves the great disadvantage, that when the spent washing liquor is regenerated with air or another gas containing oxygen, there results a mixture of ferric hydroxide and sulfur and the separation of the sulfur from the iron sludge is very expensive. One is further forced to keep the percentage of iron in such solutions as low as possible in order to obtain the most favorable proportion between the sulfur and the iron. This entails the drawback, that the absorbing capacity of such washing liquor for hydrogen sulfide is comparatively small.

With an iron content of about 2 kgs. per cubic meter of the solution, not more than 100 cubic meters of gas can be treated at the utmost.

I have now found that the drawbacks described above can be obviated by combining the methods hitherto used in a predetermined manner.

These combinations which allow removing all ammonia and hydrogen sulfide from a gas containing less than $2NH_3$ per $1H_2S$ are governed by rules, which shall now be set out in detail.

It must first be decided whether the method to be employed shall be a direct, an indirect or a semi-direct one.

1. A direct method is one, which is operated above the dew point of the gas, and which therefore causes the total contents of ammonia in the gas to enter the purification apparatus together with the gas.

If such direct method is operated in stages, the removal of part of the hydrogen sulfide before washing the metal thionate solutions must not be effected with means, which simultaneously absorb ammonia and hydrogen sulfide. Therefore in a direct process the first washing operation may be effected by means of a suspension of ferric hydroxide, which merely removes hydrogen sulfide from the gas, the quantity of ammonia absorbed by the suspension being only insignificant. The operation must be conducted in such manner that a quantity of hydrogen sulfide is removed, which leaves in the gas escaping from the purification apparatus only $2NH_3 : 1H_2S$. If the gas is then washed with an iron thionate solution or another suitable metal thionate solution, such solution will extract from the gas the total contents of ammonia together with the total residual quantity of hydrogen sulfide.

Ferric hydroxide being capable of a quick reaction with hydrogen sulfide, the method may also be operated in such manner that the sequence of the two stages is reversed. In this case the total contents of ammonia and the corresponding portion of the hydrogen sulfide according to the ratio $2NH_3 : 1H_2S$ is washed out by the iron thionate solution, and the balance of hydrogen sulfide is then extracted by the washing liquor containing ferric hydroxide in suspension.

The process described above, if conducted in a predetermined manner, involves another very important advantage viz. that the sulfur resulting in the preparation of ferric hydroxide by treating ferric sulfide with air is recovered free from iron without any extra expense. For in consequence of the fact that in both stages the metal is converted into sulfide (in the case of iron into FeS), the spent washing liquors resulting in the two stages can first be combined and one part thereof can be treated with sulfur dioxide to obtain an iron thionate solution for one stage, while the rest can be treated with air to obtain a ferric hydroxide suspension for the other stage. As when mixing the two solutions before the regeneration and subdividing the mixture again, all particles of the liquid are brought in contact with sulfur dioxide, the metal sulfide being thereby dissolved, the free sulfur resulting in the reaction remains over and can be separated from the liquor by filtration free from iron, a step which does not involve any costs.

In the flow sheet affixed to this specification and forming part thereof my invention is illustrated by way of example.

*Example 1.*—A coke oven gas which at a temperature above its dew point (about 65° C.) contains about 8 gr. $NH_3$ and 12 gr. $H_2S$ per cubic meter, is first washed, without having previously been cooled below its dew point, with a liquor containing 20 to 50 kgs. iron per cubic meter in the form of hydroxide suspended in the liquor. The gas is deprived in this operation of part of its hydrogen sulfide. Preferably the operation is conducted in such manner that about one-third of the hydrogen sulfide is removed, which can easily be effected by washing the gas only during a comparatively short time. The gas is thereafter washed with a solution which contains the same quantity of iron per cubic meter in the form of iron thionates, for instance iron thiosulfate and iron polythionate. In this operation the gas is deprived of the total contents of ammonia and hydrogen sulfide still present therein.

For the purpose of regeneration the two spent washing liquors are now mixed and thereafter subdivided in the proportion of about 1:2. The smaller portion is treated with gases containing oxygen, for instance air, the other part with sulfur dioxide or gases containing same, to effect the regeneration. The two portions of the regenerated liquor are then returned into the two washing apparatus to act upon fresh quantities of gas.

In order to recover the sulfur resulting in the two regeneration processes in pure form, the portion of the liquor which has been treated with sulfur dioxide is first subjected to filtration, whereby the sulfur is recovered in pure form.

This process may also be carried out in such manner that the two washing operations follow each other in inverted sequence.

2. If it is desired to use a semi-direct method in which the gas is first cooled down vigorously, so that part of the ammonia is dissolved in gas liquor to be recovered therefrom by distillation, preliminary washing of the gases in order to remove part of the hydrogen sulfide if operating in two stages, may also be effected only by means of a suspension of ferric hydroxide. All other means would also absorb ammonia, so that when subsequently washing, for instance with iron thionate solutions or the like, some ammonia would be missing. The ferric hydroxide itself may be used exactly in the same manner as in the case of a direct method, as described in Example 1, i. e. for the removal of that portion of the hydrogen sulfide, which exceeds the ratio $2NH_3 : 1H_2S$, either before or after washing with iron thionate.

The ammonia obtained by distilling the gas liquor can be introduced into the apparatus serving for washing the gas with thionate solutions either by conducting the vapors containing ammonia directly into the washing apparatus or into the gas before it enters same. It is however also possible to condense these vapors and to allow the condensed ammonia liquor thus obtained to run into the washing liquor containing iron thionate. There is no need for freeing the condensed ammonia liquor, when distilling same, from hydrogen sulfide and carbon dioxide.

*Example 2.*—A gas as described with reference to Example 1 is first cooled down to about 30–35° C. In this operation a part (which may be one half) of the ammonia in the gas is recovered under the form of gas liquor which is distilled in a well known manner, vapors containing ammonia escaping from the still. If the cooled gas is now washed in the manner described with reference to Example 1, the concentrated ammonia vapors need merely be introduced into the gas before the first or the second washing operation, in order to obtain exactly the same effect as in the process described with reference to Example 1. Of course it is also possible to condense the ammonia vapors by cooling and to conduct the concentrated ammonia liquor thus obtained into the washing liquor of that washing stage which is operated with iron thionate solutions.

3. If it is desired to use an indirect process, i. e. a process in which the gas is first cooled down, part of the ammonia contained therein being recovered in the form of gas liquor, while the rest is removed by washing the gas with water, and all the washing liquors containing ammonia being subjected to distillation to recover the ammonia, all the means enumerated above may be used for freeing the gas from part of the hydrogen sulfide contained therein.

*Example 3.*—A gas of the kind described with reference to Example 1 is first cooled down as described with reference to Example 2, whereby part of its contents of ammonia is obtained in the form of gas liquor. The residual ammonia in the gas is now removed by washing with water. The two liquors containing ammonia are now subjected to distillation and the resulting vapors are returned into the process either as such or after condensation, exactly as described with reference to Example 2.

4. When using suspensions of ferric hydroxide on the one side and solutions of iron thionates on the other side in successive stages, the process may further be simplified by washing the gas with a single washing liquor. Such liquor is obtained by using the washing liquors of the two stages together on a single apparatus. The gas is thus washed with a solution which contains a hydroxide in suspension and metal thionates in solution. If the gas is brought in contact with such combined washing liquors, the liquor will absorb from the gas ammonia and hydrogen sulfide in any desired ratio, the iron thionate combining with the total contents of ammonia and one half of the equivalent of hydrogen sulfide, while the ferric hydroxide combines with the residual hydrogen sulfide. In both portions of the liquor ferric sulfide is formed. The spent washing liquor is regenerated in such manner that it is divided in two portions, one of which is converted into an iron thionate solution by treatment with sulfur dioxide, while the other is treated with air to produce ferric hydroxide. The two regenerated portions are then mixed and returned into the washing apparatus.

Also in this case the free sulfur resulting in the treatment with air is recovered in pure form, when treating part of the washing liquor with sulfur dioxide, and can again be recovered by simple filtration.

When producing ferric hydroxide in the spent washing liquor by treating same with air, it is astonishing to find that the oxidation of the ferric sulfide is not disturbed by the presence of the thionates in the solution, which may amount to 50 per cent and more; no such process has hitherto been suggested.

*Example 4.*—A gas as described with reference to Example 1 is washed with a liquor containing 10 to 50 kgs. iron per cubic meter, about one third of the iron under the form of hydroxides, about two thirds under the form of thionates. The treatment may now be either a direct or a semi-direct or an indirect one, corresponding to one of the Examples 1 to 3. The total contents of ammonia is combined in the washing liquor and the total contents of hydrogen sufide is extracted, also the iron thionate extracting from the gas a quantity of hydrogen sulfide and ammonia, which corresponds to the proportion $2NH_3 : 1H_2S$. The hydrogen sulfide in excess of this proportion is combined with the ferric hydroxide in order to regenerate the spent washing liquor which besides ammonium thionate and free sulfur contains the iron in the form of FeS. The liquor is subdivided in about the ratio of 1 : 2 and the two portions are separately regenerated, one with air, the other with sulfur dioxide or gases containing same. The latter portion is first freed from the sulfur by filtration and both portions are then returned into the washing apparatus.

5. In the case of an indirect method the combination processes utilizing suspensions of ferric hydroxide and solutions of metal thionates can also be carried out in such a manner that the gas to be freed from ammonia and hydrogen sulfide is alternately treated with one or the other washing liquor, only a single washer being required.

In such a case merely hydrogen sulfide is extracted for some time by the ferric hydroxide without any material quantity of ammonia being absorbed. Thereafter the gas is washed with iron thionate solutions, the total amount of ammonia being used. In this manner the same effect is obtained of altogether freeing a gas containing less ammonia than $2NH_3:1H_2S$ from hydrogen sulfide and simultaneously combining the total quantity of ammonia present in the gas.

In this case the two spent washing liquors containing ferric sulfide, before being regenerated with air on the one hand and with sulfur dioxide on the other hand, must be combined from time to time or continuously and must then be subdivided again for the purpose of regeneration. In this manner the free sulfur formed when treating part of the washing liquor with air is freed from iron by the dissolution of the ferric sulfide so that it can be recovered by simple filtration.

Another mode of operating with two different washing liquors consists in that the gas is subdivided into two or more parts. If operating by an indirect method, one part of the gas is then extracted with ferric hydroxides, the other with iron thionates, the total or at least the greater part of the ammonia available, being added. Here also free sulfur is recovered by mixing the two washing liquors before regenerating them separately.

This mode of operating offers a particular advantage in the case where distillation gases and some other gas, such as for instance water gas, are produced, the water gas being added to the distillation gas in order to obtain a predetermined heating value.

If operating in a semi-direct manner, an alternating treatment with ferric hydroxides and iron thionates cannot be carried through in exactly the same manner inasmuch as the gas liquors contain a certain quantity of ammonia. In that case, as part of the ammonia can be accumulated in the form of condensed ammonia liquor, the gas may be treated alternately with washing liquors, in which either ferric hydroxides or iron thionates predominate. The spent washing liquors must be mixed also in this case before being regenerated separately.

The particular technical advantage of these modes of operating consists therein, that they can easily be adapted to widely differing conditions of operation and to all kinds of apparatus.

The purification effect is practically independent from all variations in the composition of the gas and in the production, more especially when different kinds of gas are produced. The possibility of accumulating either all or the greater part of the ammonia in the gas, renders it possible for instance for the purpose of repairs, to temporarily throw out one or the other regeneration apparatus, so that the operation of the process is thus rendered uniform in an extraordinary degree.

6. If it is desired not to remove that part of the hydrogen sulfide $1H_2S$ which exceeds the proportion $2NH_3:1H_2S$ with ferric hydroxide, the hydroxide may be replaced by a solution of ammonium polythionate or a solution of ammonium thiosulfate, to which sulfur dioxide is added. However in view of the fact that the two solutions will also absorb ammonia, the ammonia must first be removed from the gas, as otherwise it would be missing when subsequently treating the gas with thionate solutions. These modes of washing the gas can therefore be carried out only in the form of the indirect method, it being necessary in each case to concentrate the ammonia recovered from the washing liquors by distillation and to subsequently return it into the process and more especially into the washing operations with metal thionates.

a. If an ammonium polythionate solution shall first be used, which has only a comparatively slow action, it can merely be used for effecting a preliminary washing of the gas. I may for instance begin with a solution which, according to the contents of $NH_3$ in the gas liquor concentrated by distillation, may contain 10–60 per cent ammonium polythionate. This solution extracts from the gas, free from ammonia, part of the hydrogen sulfide, the polythionate being converted into thiosulfate and free sulfur being formed. The thiosulfate is always reconverted into polythionate by treating it with sulfur dioxide and can thus be used afresh for the preliminary washing of the gas, while the sulfur is separated by filtration. It does not matter whether the polythionate solutions contain metal or not.

b. Exactly the same applies if a solution of thiosulfate is used which contains sulfur dioxide. This solution can also be used only in a preliminary step. In order to carry out this process, the solution of thiosulfate which may for instance contain 10–60 per cent thiosulfate, is either treated with sulfur dioxide in a separate apparatus and is then introduced into the preliminary washer, or the required quantity of sulfur dioxide can be added to the gas before it enters the preliminary washer. The thiosulfate is gradually converted into polythionate, while free sulfur is formed from the hydrogen sulfide extracted from the gas and from a corresponding quantity of sulfur dioxide. In this case also it does not matter, whether thiosulfate solutions containing metal or free from metal are used.

In both cases the concentrated ammonia obtained by distillation of the watery liquors containing ammonia is conducted without previous purification into the washing operation, operating with metal thionates, exactly as described with reference to Example 3.

In order to recover from the concentrated solution of ammonium salt the sulfate and sulfur it is preferable, in contradistinction to the methods hitherto employed, according to which the sulfate solution was freed from metal by acting thereon with fresh gas, to insert this step in the process, before the sulfate is formed, as only by so doing the formation of ferric disulfides ($FeS_2$) can be prevented, which cannot be dissolved by treatment with sulfur dioxide.

7. These methods at the same time enable me to extract from the gas also the cyanogen contained therein and to convert same into ammonium thiocyanate, from which can then be obtained ammonium sulfate and sulfur in the manner described in my copending application for Letters Patent of the United States for "improvements in treating thiocyanates," Ser. No. 298,617.

In this copending application I have shown that if ammonium thiocyanate is decomposed hydrolytically within the washing liquor, which results in the purification of coal distillation gases, such washing liquor containing either polythionates or corresponding quantities of thiosulfate and sulfur dioxide combined therewith, the two being converted into polythionates, or if such salts or sulfur dioxide or both are introduced into the liquor, or if ammonium bisulfite or ammonium sulfite are present therein, ammonium sulfate and free sulfur will result. I have further shown that these conversions of ammonium thiocyanate take place slowly at ordinary temperature and more rapidly at an elevated temperautre, more especially under pressure, preferably at a temperature varying between 140–160° C. and above.

As all the washing liquors used in the purification of the gas contain free sulfur and as the suspensions of ferric hydroxide as well as the iron thionate solutions can contain some ammonia during the washing procedure, they will also absorb from the gas all cyanogen compounds, which are converted into ammonium thiocyanate. When treating the spent washing liquors for the production of ammonium sulfate and sulfur, the ammonium thiocyanate is also converted into ammonium sulfate and free sulfur.

Thus the yield of ammonium sulfate in a gas washing process is materially increased for the first time. It is well known that the cyanogen compounds in the gas are formed thereby, that part of the ammonia present in the gas, being primarily formed from the nitrogen in the coal, when acted upon by the incandescent coal and the hot products of distillation, is converted into cyanogen compounds. Thereby hitherto a material proportion of the ammonia, about 10–20% and more was decomposed. The present process therefore enables me to obtain 10–20 per cent and more ammonium sulfate in excess of the quantity hitherto obtainable.

*Example 5.*—A gas having the composition described with reference to Example 1 and besides containing 1.7 grs. cyanogen compounds per cubic meter (calculated as hydrocyanic acid) is washed in accordance with one of the methods above described. The total contents of cyanogen compounds is extracted by the washing liquors which may have an ammoniacal reaction. Such washing liquors may either contain ferric hydroxide in suspension or metal thionates in solution. The solutions obtained after separating out the iron in the form of FeS, contain besides ammonium thionates also ammonium thiocyanate. If the solutions are treated as described in my copending application for patent mentioned above, the thiocyanate is converted in the same manner as the thionates in solution into ammonium sulfate and sulfur. I thus obtain an increase in the yield of ammonium sulfate formed from the ammonia in the gas, which amounts to 13.4 per cent, the nitrogen contents of the cyanogen compounds being also converted into ammonia.

*Example 6.*—A gas containing 8 grs. $NH_3$, 12 grs. $H_2S$ and 1.7 grs. cyanogen compounds (calculated as HCN) per cubic meter is treated for instance as described with reference to one of the preceeding examples and, after the washing liquor is exhausted, the ammonium salt solution is separated from the ferric sulfide formed either by filtration or by decantation, centrifuging or the like. There is obtained an ammonium salt solution containing ammonium thiosulfate and ammonium thiocyanate in the molecular proportion of 4.24 : 1.00, the contents of salt varying within wide limits according to the manner of proceeding and to the concentration of the ammonia liquor. It is possible to increase the concentration of the salts in the solution to about 70 per cent.

If the solution contains for instance 460 grs. ammonium thiosulfate and 55.8 grs. ammonium thiocyanate per liter, 193.4 grs. sulfur dioxide per liter are introduced into the solution and the liquor thus treated is at once heated in an autoclave to 140–160° C. or preferably to about 200–220° C. The autoclave may either consist of a chrome-nickel-steel alloy resisting the action of sulfur dioxide or it may be lined with such alloy or with some other acid proof lining.

The salts dissolved in the liquor are decomposed into ammonium sulfate, sulfur and carbon dioxide, 507 grs. ammonium sulfate, 196.6 grs. sulfur and 32.3 grs. carbon dioxide being recovered per liter of the original salt solution.

*Example 7.*—The salt solution is treated exactly as described with reference to Example 6, but 257.5 grs. sulfur dioxide are introduced per liter of the original solution. If the solution is then treated as described with reference to Example 6, there are obtained 10.7 grs. sulfur per liter of the original solution in excess of the quantity obtained according to Example 6. In other words instead of 196.6 grs. there are obtained 207.3 grs. sulfur, besides which are formed 65.4 grs. free sulfuric acid.

For the purpose of recovering neutral ammonium sulfate, this acid solution can be neutralized before evaporation with ammonia liquor or the like, or else the mother liquor rich in sulfuric acid, which remains over when evaporating, can be returned from time to time into the decomposition vessel to replace part of the sulfuric acid to be added.

*Example 8.*—A salt solution is treated as described with reference to Example 6, however the liquor is not heated at once, but is allowed to stand some time after the sulfur dioxide has been introduced. The thiosulfate in solution will then be gradually converted under the action of the sulfur dioxide into poly-thionates, in the first line tri- or tetrathionate. If the solution is then heated, which now mainly contains, instead of the thiosulfate and sulfur dioxide, polythionates and ammonium thiocyanate, the heating being effected as described with reference to Examples 6 or 7, exactly the same result will be obtained including the same quantities of ammonium sulfate, sulfur and carbon dioxide as in Example 6.

*Example 9.*—A solution as described with reference to Example 7, into which sulfur dioxide has been introduced, is treated exactly as described with reference to Example 8, and the same products are obtained as in Example 7.

*Example 10.*—To a solution as described with reference to Example 6, are added 997 grs. sulfuric acid of 20 per cent and the liquor is heated as described with reference to Example 6. There are formed 507 grs. ammonium sulfate, 163.9 grs. sulfur and 32.25 grs. carbon dioxide.

The latter example shows that a mixture of thiosulfate and ammonium thiocyanate can also be decomposed into sulfate and sulfur by adding sulfuric acid, and in consequence thereof the acid solutions of ammonium sulfate obtained according to Examples 7 and 9 can be treated further in such manner, that the mother liquors rich in sulfuric acid, which result after evaporation for the recovery of the sulfate, can be utilized for decomposing further quantities of thiosulfate—ammonium thiocyanate solutions. Therefore in this case part of the sulfur dioxide used according to Examples 6 to 9 may be replaced by sulfuric acid, 3 molecules $SO_2$ being replaced by 2 molecules $H_2SO_4$.

Obviously the proportions given in the examples need not be the same throughout, but all such solutions can be treated for the recovery of sulfate and sulfur which contain, besides ammonium thiocyanate, ammonium thiosulfate, sulfur dioxide, ammonium polythionate and sulfuric acid. Sulfites and bisulfites may also be present.

In calculating the composition of such solutions, the following rules apply:

1. $1NH_4CNS$ is decomposed to form sulfate and sulfur by means of
   *a.* 2 molecules $SO_2$
   *b.* 2 molecules polythionate
   *c.* 2 molecules thiosulfate + 3 molecules $SO_2$
   *d.* 8 molecules bisulfite
   *e.* 2 molecules thiosulfate + 2 molecules $H_2SO_4$.

2. Thiosulfates, sulfites, bisulfites and polythionates are decomposed under the formation of sulfate and sulfur according to the following rules:
   *a.* 2 molecules thiosulfate + 1 molecule polythionate
   *b.* 2 molecules sulfite + 1 molecule polythionate
   *c.* 2 molecules bisulfite + 1 molecule thiosulfate
   *d.* 2 molecules bisulfite + 1 molecule sulfite.

Any of these stocks may be mixed with each other in any desired proportion and in all cases sulfate and sulfur will result. If more sulfite or thiosulfate is present than corresponds to these prescriptions, non-decomposed thiosulfate and, if ammonium thiocyanate is present, also non-decomposed ammonium thiocyanate will remain in solution.

On the other hand if the solution contains more bisulfite or more polythionate than indicated above, there are formed besides sulfate and sulfur more or less free sulfuric acid and, if ammonium thiocyanate is present, also carbon dioxide. In such case, as shown above, the mother liquor rich in sulfuric acid which remains over when evaporating for the recovery of sulfate, is preferably returned into the decomposition vessel.

Various changes may be made in the details disclosed in the foregoing specification without departing from the invention or sacrificing the advantages thereof.

In the claims the terms "metal hydroxide of the iron group" and "metal thionate of the iron group" are intended to mean iron and manganese exclusively.

I claim:—

1. The method of treating coke oven gases for the recovery therefrom of useful admixtures comprising treating such gas with a suspension of a metal hydroxide of the iron group to remove part of the hydrogen sulfite and thereafter with a metal thionate of the iron group to remove the residual hydrogen sulfide and the ammonia.

2. The method of treating coke oven gases for the recovery therefrom of useful admixtures comprising treating such gas at a temperature above its dew point with a suspension of a metal hydroxide of the iron group to remove part of the hydrogen sulfide and thereafter with a metal thionate of the iron group to remove the residual hydrogen sulfide and the ammonia.

3. The method of treating coke oven gases for the recovery therefrom of useful admixtures comprising treating such gas with a suspension of a metal hydroxide of the iron group to remove that part of the hydrogen sulfide which exceeds the proportion of $2NH_3:1H_2S$ in the gas and thereafter with a metal thionate of the iron group to remove the residual hydrogen sulfide and the ammonia.

4. The method of treating coke oven gases for the recovery therefrom of useful admixtures comprising treating such gas with a suspension of ferric hydroxide to remove part of the hydrogen sulfide and thereafter with a ferrous thionate to remove the residual hydrogen sulfide and the ammonia.

5. The method of treating coke oven gases for the recovery therefrom of useful admixtures comprising treating such gas at a temperature above its dew point with a suspension of ferric hydroxide to remove that part of the hydrogen sulfide which exceeds the proportion $2NH_3:1H_2S$ in the gas and thereafter with a ferrous thionate solution to remove the residual hydrogen sulfide and the ammonia.

6. The method of treating coke oven gases for the recovery therefrom of useful admixtures comprising treating such gas with a suspension of metal hydroxide of the iron group to remove part of the hydrogen sulfide and then with a solution of a metal thionate of the iron group to remove the residual hydrogen sulfide and the ammonia, mixing the spent suspension of metal hydroxide and the spent solution of metal thionate, dividing the mixture and treating one part with a gas containing oxygen, the remaining part being treated with a gas containing sulfur dioxide, to regenerate said liquors for use in a further operation.

7. The method of treating coke oven gases for the recovery therefrom of useful admixtures comprising treating such gas with a suspension of a metal hydroxide of the iron group to remove part of the hydrogen sulfide and then with a solution of a metal thionate of the iron group to remove the residual hydrogen sulfide and the ammonia, mixing the spent suspension of metal hydroxide and the spent solution of metal thionate, dividing the mixture and treating one part with air, the remaining part being treated with a gas containing sulfur dioxide, to regenerate said liquors for use in a further operation.

8. The method of treating coke oven gases for the recovery therefrom of useful admixtures comprising treating such gas with a suspension of ferric hydroxide to remove part of the hydrogen sulfide and then with a solution of a metal thionate of the iron group to remove the residual hydrogen sulfide and the ammonia, mixing the spent suspension of ferric hydroxide and the spent solution of iron thionate, dividing the mixture and treating one part with air, the remaining part being treated with a gas containing sulfur dioxide, to regenerate said liquors for use in a further operation.

9. The method of treating coke oven gases for the recovery therefrom of useful admixtures comprising treating such gas with a suspension of a metal hydroxide of the iron group to remove part of the hydrogen sulfide and then with a solution of a metal thionate of the iron group to remove the residual hydrogen sulfide and the ammonia, mixing the spent suspension of metal hydroxide and the spent solution of metal thionate, dividing the mixture and treating one part with a gas containing oxygen, the remaining part being treated with a gas containing sulfur dioxide and removing the sulfur to regenerate said liquors for use in a further operation.

10. The method of treating coke oven gases for the recovery therefrom of useful admixtures comprising treating such gas with a suspension of a metal hydroxide of the iron group to remove part of the hyrdrogen sulfide and then with a solution of a metal thionate of the iron group to remove the residual hydrogen sulfide and the ammonia, mixing the spent suspension of metal hydroxide and the spent solution of metal thionate, dividing the mixture and treating about one-third with a gas containing oxygen and the remaining two-thirds with a gas containing sulfur dioxide, to regenerate said liquors for use in a further operation.

11. The method of treating coke oven gases for the recovery therefrom of useful admixtures comprising treating such gas with a suspension of a metal hydroxide of the iron group to remove part of the hydrogen sulfide and then with a solution of a metal thionate of the iron group to remove the residual hydrogen sulfide and the ammonia, mixing the spent suspension of metal hydroxide and the spent solution of metal thionate, dividing the mixture and treating about one-third with air and the remaining two-thirds with a gas containing sulfur dioxide, to regenerate said liquors for use in a further operation.

12. The method of treating coke oven gases for the recovery therefrom of useful admixtures comprising treating such gas with a suspension of ferric hydroxide to remove part of the hydrogen sulfide and then with a solution of a metal thionate of the iron group to remove the residual hydrogen sulfide and the ammonia, mixing the spent suspension of ferric hydroxide and the spent solution of metal thionate, dividing the mixture and treating about one-third with air and the remaining two-thirds with a gas containing sulfur dioxide, to regenerate said liquors for use in a further operation.

13. The method of treating coke oven gases for the recovery therefrom of useful admixtures comprising treating such gas with a suspension of a metal hydroxide of the iron group to remove part of the hydrogen sulfide and then with a solution of a metal thionate of the iron group to remove the residual hydrogen sulfide and the ammonia, mixing the spent suspension of metal hydroxide and the spent solution of metal thionate, dividing the mixture treating about one-third with a gas containing oxygen, the remaining two-thirds with a gas containing sulfur dioxide and removing the sulfur to regenerate said liquors for use in a further operation.

14. The method of treating coke oven gases for the recovery therefrom of useful admixtures comprising cooling such gas below its dew point to effect condensation of gas liquor and treating such gas with a suspension of a metal hydroxide of the iron group to remove part of the hydrogen sulfide and thereafter with a metal thionate of the iron group to which has been added ammonia from said gas liquor to remove the residual hydrogen sulfide and the ammonia.

15. The method of treating coke oven gases for the recovery therefrom of useful admixtures which comprises cooling such gas below its dew point, recovering part of the ammonia in the gas by condensation in the form of gas liquor, washing the gas with water to recover another part of the ammonia, mixing said gas liquor and the ammonia solution obtained by washing, expelling ammonia therefrom by distillation, treating the gas partly freed from ammonia with a metal hydroxide to remove part of the hydrogen sulfide, introducing the ammonia vapors obtained by distillation into a solution of a metal thionate of the iron group and treating the gas with such solution to remove the ammonia and the residual hydrogen sulfide therefrom.

16. The method of treating coke oven gases for the recovery therefrom of useful admixtures which comprises treating such gas in one stage with a watery suspension of a metal hydroxide of the iron group and in another stage with a watery solution of a metal thionate of the iron group.

17. The method of treating coke oven gases for the recovery therefrom of useful admixtures which comprises treating such gas in one stage with a watery suspension of a metal hydroxide of the iron group in another stage with a watery solution of a metal thionate of the iron group, mixing the spent liquors, dividing the mixture and treating one part thereof with air, the remaining part being treated with sulfur dioxide for regeneration, removing sulfur by filtration from the liquor treated with sulfur dioxide, and reusing the liquors thus treated in cycle.

18. The method of treating coke oven gases for the recovery therefrom of useful admixtures which comprises treating such gas in one stage with a watery suspension of a metal hydroxide of the iron group, in another stage with a watery solution of a metal thionate of the iron group, dividing the mixture, treating about one third thereof with air and the other two thirds with sulfur dioxide for regeneration, removing sulfur by filtration from the liquor treated with sulfur dioxide, and reusing the liquors thus treated in cycle.

In testimony whereof I affix my signature.

CHRISTIAN J. HANSEN.